Feb. 13, 1968   N. HELMSCHROTT   3,369,248
RECORDING PENDULUM WITH PLURAL DRIVE MEANS
Filed April 22, 1966
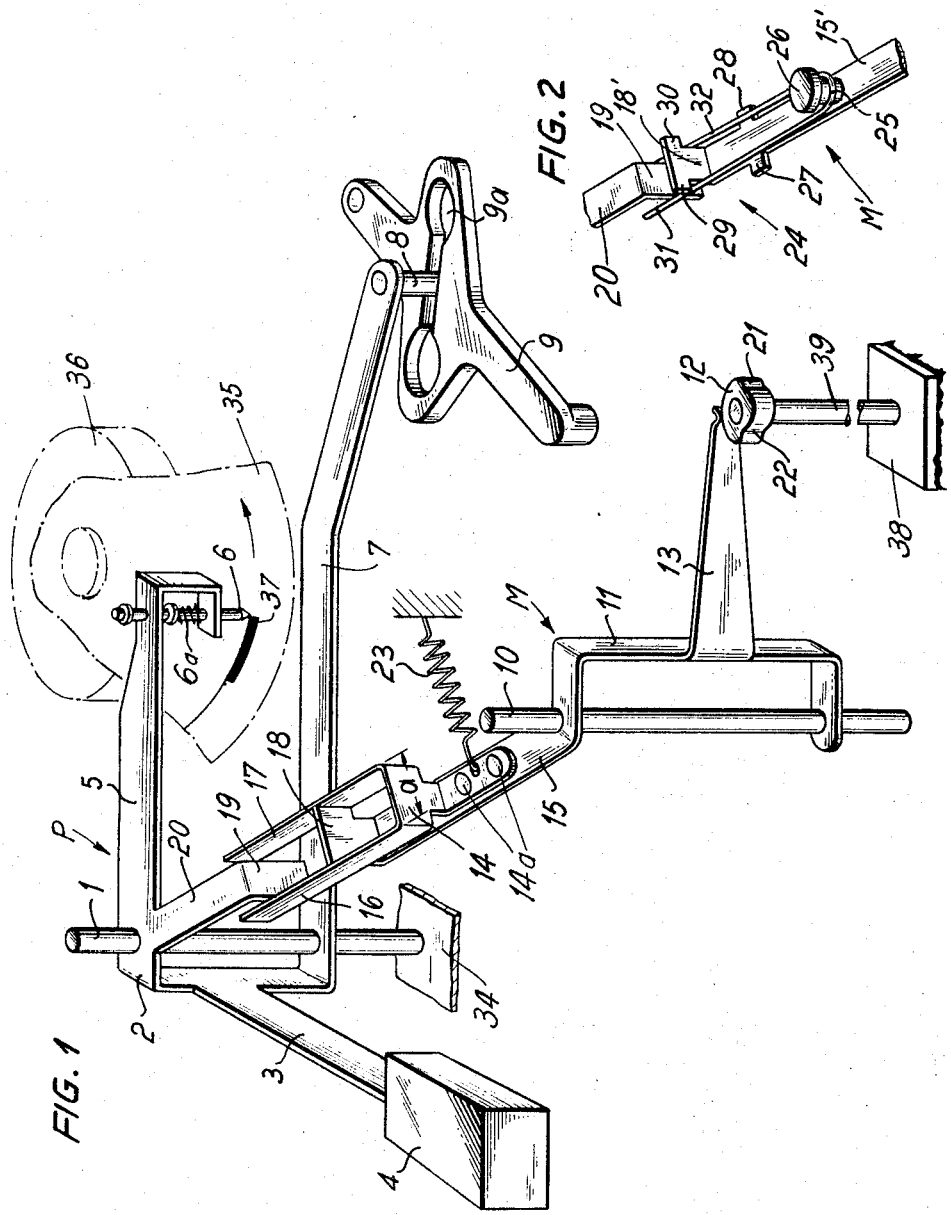
INVENTOR
NORBERT HELMSCHROTT
BY Michael S. Striker
his ATTORNEY United States Patent Office 3,369,248
Patented Feb. 13, 1968

3,369,248
RECORDING PENDULUM WITH PLURAL
DRIVE MEANS
Norbert Helmschrott, Schwenningen, Germany, assignor
to Kienzle Apparate G.m.b.H., Villingen, Germany
Filed Apr. 22, 1966, Ser. No. 544,448
Claims priority, application Germany, Apr. 23, 1965,
K 55,894
14 Claims. (Cl. 346—7)

ABSTRACT OF THE DISCLOSURE

A motorcar has a vibratory recording pendulum which is oscillated not only by vibrations of the car caused by the road surface or by the engine, but also by mechanical impulses produced by a cam rotating with an odometer shaft and driving a follower acting on the pendulum.

The present invention relates to an apparatus which may be utilized to record various phases in the operation of engine-driven automotive vehicles. More particularly, the invention relates to an apparatus which may perform the function of an odograph and which is also capable of keeping a record of periods during which the engine of an automotive vehicle is either idle or running.

It is already known to provide an automotive vehicle with an odograph wherein a stylus plots on a time chart a curve indicating all such periods during which the vehicle was in actual motion. A serious drawback of such odographs is that the configuration of the curve is inconclusive if the odometer breaks down or if the driver intentionally disconnects the odometer. It is also known to provide a separate recording apparatus which plots a different curve in response to vibrations of the vehicle when the engine is running and/or when the vehicle is in actual motion. Such separate recording apparatus is used for the purpose of insuring that a record of various phases in the operation of a vehicle will be kept even if the odometer breaks down and/or if the odometer is disconnected by unauthorized persons.

Conventional apparatus which are responsive to vibrations of the vehicle are not entirely satisfactory, mainly because their proper functioning depends on the position of the plane in which their oscillatory parts are mounted and also because the vibrations are often very weak, especially if the vehicle travels on a relatively smooth road surface and/or when the chassis is mounted on highly effective pneumatic shock absorbers. When the vehicle travels on a road surface, its chassis normally vibrates up and down so that, if the oscillatory parts of the separate recording apparatus are not positioned to respond to such types of vibrations, the apparatus is not sufficiently sensitive and the oscillations will be imperceptible when the vehicle travels on a smooth road surface.

Accordingly, it is an important object of the present invention to provide a novel and improved recording apparatus which plots a single curve and wherein an examination of such single curve enables an evaluator or an evaluating instrument to determine whether or not the vehicle was caused to vibrate in response to running of the engine and/or in response to movement of the vehicle, as well as whether or not the odometer of the vehicle was in operation.

Another object of the invention is to provide a recording apparatus of the just outlined characteristics whose oscillatory components may be placed into any desired plane.

A further object of the invention is to provide a novel operative connection between the recording or curve plotting member and the odometer of the improved recording apparatus.

An additional object of the invention is to provide a recording apparatus wherein the thickness or width of the curve plotted by a stylus or the like enables an evaluator to determine the identity of the person who was in charge of the vehicle during a certain shift.

Still another object of the invention is to provide a recording apparatus which can record different types of information even if the odometer is disconnected or breaks down.

A further object of my invention is to provide a recording apparatus which can be installed in all types of automotive vehicles, which occupies little room, and which may utilize a conventional odometer.

An additional object of the instant invention is to provide a recording apparatus which is capable of plotting a curve with such accuracy that the curve may be readily evaluated by automatic devices and which can plot a continuous curve regardless of the momentary condition of the vehicle.

Briefly stated, one feature of the present invention resides in the provision of an apparatus which may be utilized for recording various phases in the operation of an engine-driven automotive vehicle. The apparatus comprises a pendulum preferably including a weight mounted on an arm and oscillatable in or on the chassis of the vehicle about a fixed axis in response to vibrations produced by the running engine and/or in response to vibrations produced by the chassis when the vehicle is in motion, a stylus or an analogous recording member which is oscillatable with the pendulum, a clockdriven record carrier which is in contact with the recording member so that the latter plots on the carrier a preferably beam-shaped curve whose outline indicaes whether the engine is idle as well as whether the engine is running and/or the vehicle is in motion, odometer means including a driven member arranged to produce impulses at a frequency which is a function of the distance covered by the moving vehicle, and a motion transmitting device for transmitting the impulses to the pendulum and hence to the recording member in such a way that the curve plotted by the recording member indicates the presence or absence of impulses in addition to such configurations of the curve which are due to the presence or absence of oscillations of the pendulum.

The novel features which are considered as characteristic of the invention are set forth in particular in the appended claims. The improved recording apparatus itself, however, both as to its construction and its mode of operation, together with additional features and advantages thereof, will be best understood upon perusal of the following detailed description of certain specific embodiments with reference to the accompanying drawings, in which:

FIG. 1 is a somewhat schematic perspective view of a recording apparatus which embodies one form of the present invention; and FIG. 2 is a perspective view of a modified motion transmitting device.

Referring to the drawings in detail, and first to FIG. 1, there is shown a recording apparatus which may be installed in a sealable or lockable housing 34 in or on the chassis of an engine-driven automotive vehicle. The housing 34 accommodates a fixed supporting shaft 1 which may be vertical, horizontal or whose axis may be inclined with reference to a horizontal and with reference to a vertical plane. The shaft 1 carries an oscillatable pendulum P which includes a bearing bracket 2 rotatable on the shaft 1 and provided with a pendulum arm 3 for a weight or mass 4. The weight 4 is spaced from the shaft 1 and the bracket 2 is further provided with a second arm 5 whose free end portion carries a recording member here shown as a stylus 6 which is biased upwardly, as viewed in FIG. 1, by a helical spring 6a. The tip of the stylus 6 abuts against the underside of a record carrier 35 which is driven by a suitable clockwork mechanism 36 so that it moves at a constant speed whereby the stylus plots on the carrier 35 a curve 37 which is indicative of various phases of operation of the automotive vehicle. A third arm 7 of the bearing bracket 2 forms part of a selector device which determines the maximum amplitude of oscillations of the pendulum P and stylus 6. This selector device further comprises a selector member 9 which resembles a plate and may be adjustably affixed to the housing 34 in such a way that it can be rocked about a fixed pivot pin 9b. The selector member 9 is formed with a specially configurated cam groove 9a having portions of different width, and this groove receives a follower stud 8 which is mounted at the free end of the arm 7. By engaging the projection 9c of the selector member 9 and by rocking the latter to a selected angular position with reference to the pivot pin 9b, a supervisor can select the maximum amplitude of the pendulum P and hence the width of the curve 37 which is plotted by the stylus 6. Such adjustments in the position of the selector member 9 will be made when the vehicle changes hands, i.e., if a first driver hands the vehicle over to a second driver or vice versa. In other words, the width of the curve 37 will inform the evaluator of the record carrier 35 as to the identity of the person who was in charge of the vehicle during a certain period of use. The selector member 9 is normally locked in the housing 34 so that the driver cannot gain access thereto. In the embodiment of FIG. 1, the pendulum P is assumed to oscillate in a plane which is inclined with reference to a truly horizontal plane.

In accordance with an important feature of the present invention, the recording apparatus further comprises an odometer 38 which comprises a driven member here shown as a rotary cam shaft 39 whose upper end portion is provided with a specially configurated impulse generating cam 12. The periphery of this cam is tracked by a follower 13 which forms part of a motion transmitting device M and is integral with a bracket or yoke 11 which is rockable on a second fixed shaft 10. The shaft 10 is fixedly mounted in the housing 34 in parallelism with the shaft 1. The yoke 11 is integral with a radially extending holder or leg 15 which supports a resilient member here shown as a bifurcated leaf spring 14 having two projections or prongs 16, 17 which straddle a radially extending portion or arm 20 of the pendulum P. The portion 20 has a bent-over projection or lug 19 which is directly straddled by the prongs 16, 17 and is receivable between such prongs with some clearance for reasons which will be explained hereinafter. The leg 15 also comprises a bent-over projection or lug 18 which normally serves as an expander for the prongs 16, 17 and normally biases such prongs to a neutral position in which the portion 20 of the pendulum P can oscillate with reference to the resilient member 14. The latter is riveted (as at 14a) or otherwise rigidly attached to the leg 15.

The cam 12 is provided with two impulse generating portions including a lobe 21 and a recess 22 which is angularly spaced from the lobe 21. The bent-over tip 13a of the follower 13 is biased against the cam 12 by a helical expansion spring 23 and tracks the periphery of this cam so that it comes into repeated engagement with the lobe 21 and also enters the recess 22 when the cam shaft 39 is driven by the odometer 38 while the vehicle is in motion.

The distance a between the prongs 16, 17 of the resilient member 14 is selected in such a way that these prongs cannot interfere with oscillatory movements of the pendulum P at an amplitude determined by the position of the selector member 9 with reference to the follower stud 8.

The operation of the recording apparatus shown in FIG. 1 is as follows:

If the engine is idle and if the vehicle is not in motion, the pendulum P is also idle and the tip of the stylus 6 will plot on the carrier 35 a straight beam-like curve 37 which will indicate to the evaluator that the vehicle was idle during a certain interval of time which can be determined by observing the time chart provided on the record-receiving surface of the carrier 35. If the engine is started, it causes the chassis to vibrate whereby the chassis vibrates the housing 34 and the latter transmits such vibrations to the pendulum P and stylus 6. The configuration of the curve 37 is then indicative of the fact that the engine is running, i.e., that the pendulum P oscillates. The same holds true if the engine is running and/or if the vehicle is in actual motion. The chassis then vibrates in response to running of the engine and/or in response to travel of the vehicle on the road surface so that the pendulum P oscillates and the stylus 6 plots a curve 37 which will indicate to the evaluator that, during a certain interval of time, the engine was running and/or that the vehicle was in actual motion. The position of the follower stud 8 with reference to the groove 9a of the selector member 9 determines the maximum amplitude of the pendulum P and stylus 6 so that, by comparing the width of the curve with a chart, the evaluator can determine the identity of the driver or the identity of that person who was responsible for the vehicle during a certain shift.

When the vehicle is in motion, the odometer 38 drives the cam shaft 39 at a speed which is a function of the distance covered by the vehicle whereby the tip 13a of the follower 13 alternately engages the lobe 21 and enters the recess 22 of the cam 12 to rock the resilient member 14 back and forth through such angles that the prongs 16, 17 respectively transmit oppositely directed impulses to the pendulum P which oscillates at a frequency causing a certain deformation or denting of the curve 37 plotted by the stylus 6 so that the frequency at which the pendulum receives impulses from the cam 12 can be evaluated by studying the record carrier 35, either in person or by resorting to an automatic evaluator.

If the odometer 38 should break down, the evaluator can still determine all such periods of time when the engine was running and/or when the vehicle was in motion because the pendulum P will oscillate as soon as the engine is started and will cease to oscillate only when the vehicle is brought to a halt and when the engine is idle.

The lug 18 of the leg 15 prevents a recoiling of the prongs 16, 17 during transmission of impulses to the pendulum P. In other words, the lug 18 insures that the prongs 16, 17 cease to vibrate immediately after they transmit impulses to the portion 20 so that their vibrations cannot affect oscillatory movements of the pendulum in response to starting of the engine and/or in response to actual movement of the vehicle.

FIG. 2 illustrates a portion of a somewhat different motion transmitting device M'. This device again comprises a follower (not shown) corresponding to the follower 13 and a yoke whose leg 15' is connected with a resilient member in the form of a torsion spring 24 having two prongs 31, 32 which straddle the portion 20 of the pendulum P. The spring 24 is coiled around a post 26 which is mounted on the leg 15' and the latter comprises a lug 18' provided with laterally extending locating projections 29, 30. The leg 15' is further provided with two additional locating projections 27, 28 which cooperate with the projections 29, 30 to hold the prongs 31, 32 in requisite position with reference to the lug 18', i.e., to prevent upward or downward displacement of such prongs. The operation of the recording apparatus which embodies the motion transmitting device M' of FIG. 2 is the same as that of the apparatus shown in FIG. 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for recording various phases of the operation of a vehicle; comprising a pendulum mounted on the vehicle for oscillation; a recording member oscillatable with said pendulum; a driven record carrier in contact with said recording member so that the latter produces recordings on said carrier differently indicating vibrating and non-vibrating conditions of said pendulum; odometer means including a driven member for producing impulses during movement of the vehicle over a distance; and motion transmitting means for transmitting said impulses to said pendulum so that said recording member makes recordings depending both on unevenness of the road surface and the travel of the vehicle.

2. An apparatus as set forth in claim 1, wherein said driven member includes a rotary cam means; and wherein said motion transmitting means include a cam follower tracking said cam means and being oscillated by the same, and coupling means connecting said cam follower with said pendulum.

3. An apparatus as set forth in claim 2 wherein said pendulum has a projecting portion of a predetermined width; and wherein said coupling means include two prongs located on opposite sides of said projecting portion and being spaced from each other a greater distance than said predetermined width, said prongs alternately engaging said projecting portion during oscillation of said cam follower by said rotary cam means for oscillating said pendulum.

4. An apparatus as set forth in claim 1, further comprising means for selecting the maximum amplitude of said pendulum.

5. An apparatus as set forth in claim 4, wherein said last named means comprises a selector member having a groove of varying width and a follower connected with said pendulum and extending into said groove, said selector member being adjustable with reference to said pendulum so as to place said follower into a selected portion of said groove.

6. An apparatus as set forth in claim 1, wherein said pendulum is arranged to oscillate in a plane which is inclined with reference to a horizontal plane.

7. An apparatus as set forth in claim 1, wherein said pendulum comprises an arm and a weight provided on said arm and spaced from said fixed axis.

8. An apparatus for recording various phases of operation of engine-driven automotive vehicles, comprising a pendulum oscillatable in the vehicle about a fixed axis in response to vibrations produced by the running engine and/or vibrations produced by the chassis when the vehicle is in motion; a recording member oscillatable with said pendulum; a driven record carrier in contact with said recording member so that the latter plots on said carrier a curve whose outline indicates whether the engine is idle as well as whether the engine is running and/or the vehicle is in motion; odometer means including a driven member comprising a rotary cam arranged to produce impulses at a frequency which is a function of the distance covered by the vehicle; and motion transmitting means comprising a cam follower rockable about a second fixed axis and tracking this cam, and resilient means coupled to said cam follower and including a bifurcated member straddling a portion of said pendulum for transmitting the impulses to said pendulum and said recording member.

9. An apparatus as set forth in claim 8, wherein said motion transmitting means further comprises a holder rockable with said follower and supporting said bifurcated member, said holder having a projection extending between and arranged to bias said prongs away from each other.

10. An apparatus as set forth in claim 8, wherein said portion of said pendulum comprises an arm and a projection normally received with clearance between the prongs of said bifurcated member.

11. An apparatus as set forth in claim 8, wherein said bifurcated member comprises a pair of prongs and said portion of the pendulum is received between said prongs with sufficient clearance to allow for oscillation of said pendulum in response to said vibrations, said cam comprising two angularly spaced impulse generating portions each of which is arranged to move one of said prongs against said portion of the pendulum and to thus effect angular displacement of said recording member about said first named axis independently of said vibrations.

12. An apparatus as set forth in claim 11, wherein one of said impulse generating portions is constituted by a lobe and the other impulse generating portion is constituted by a recess of said cam.

13. An apparatus as set forth in claim 8, wherein said bifurcated member is a leaf spring.

14. An apparatus as set forth in claim 8, wherein said bifurcated member is a torsion spring.

References Cited

UNITED STATES PATENTS

| | | | |
|---|---|---|---|
| 1,016,518 | 2/1912 | Popp | 346—7 |
| 1,320,097 | 10/1919 | Saltler | 346—7 |
| 1,925,325 | 9/1933 | Keller | 346—7 |
| 1,992,134 | 2/1935 | Toewe | 346—7 |
| 3,000,687 | 9/1961 | Haupt | 346—7 |

RICHARD B. WILKINSON, *Primary Examiner.*

J. W. HARTARY, *Assistant Examiner.*